United States Patent [19]

Duggan et al.

[11] Patent Number: 5,789,002
[45] Date of Patent: Aug. 4, 1998

[54] GUM SWEETENER/ACID PROCESSING SYSTEM

[75] Inventors: James A. Duggan, Machesney Park, Ill.; Marc Degady, Morris Plains, N.J.; Kevin R. Tebrinke, Fort Madison, Iowa; Arthur W. Upmann, Rockton, Ill.

[73] Assignee: Warner-Lambert Company, Morris Plains, N.J.

[21] Appl. No.: 725,405

[22] Filed: Oct. 3, 1996

[51] Int. Cl.$^6$ .................................................. A23G 3/30
[52] U.S. Cl. .................... 426/3; 426/5; 426/6; 426/516; 426/518
[58] Field of Search ...................... 426/516, 5, 3, 426/4, 6, 518; 99/509, 513, 517; 425/295, 304, 312; 264/117.12, 211.12, 211.13

[56] References Cited

U.S. PATENT DOCUMENTS

| | | | |
|---|---|---|---|
| 2,256,190 | 7/1941 | Bowman | 107/54 |
| 3,455,755 | 7/1969 | Phillips | 156/204 |
| 3,644,169 | 2/1972 | Phillips | 99/135 |
| 3,908,032 | 9/1975 | Didelot et al. | 426/660 |
| 4,555,407 | 11/1985 | Kramer et al. | 426/5 |
| 4,816,265 | 3/1989 | Cherukuri et al. | 426/5 |
| 5,000,965 | 3/1991 | Killeen et al. | 426/5 |
| 5,045,325 | 9/1991 | Leska et al. | 426/516 |
| 5,057,328 | 10/1991 | Cherukuri et al. | 426/5 |
| 5,116,627 | 5/1992 | Rutherford et al. | 426/5 |
| 5,128,155 | 7/1992 | Song et al. | 426/516 |
| 5,135,762 | 8/1992 | Vernon et al. | 426/79 |
| 5,154,939 | 10/1992 | Broderick et al. | 426/516 |
| 5,165,944 | 11/1992 | Song et al. | 426/516 |
| 5,205,106 | 4/1993 | Zimmerman et al. | 426/517 |
| 5,397,580 | 3/1995 | Song et al. | 426/516 |
| 5,419,919 | 5/1995 | Song et al. | 426/516 |
| 5,424,081 | 6/1995 | Owusu-Ansah et al. | 426/516 |
| 5,486,366 | 1/1996 | Song et al. | 426/5 |
| 5,562,936 | 10/1996 | Song et al. | 526/516 |
| 5,571,543 | 11/1996 | Song et al. | 426/516 |
| 5,582,852 | 12/1996 | Ahn et al. | 426/5 |
| 5,709,895 | 1/1998 | Tanaka et al. | 426/96 |

*Primary Examiner*—Cynthia L. Nessler

[57] ABSTRACT

A process for cooling, grinding, and packaging an ingredient material, such as an encapsulated sweetener or acid, for a chewing gum product is disclosed. The material is extruded from an extruding machine directly onto a conveyor. The conveyor transports the liquid material, preferably in elongated strings, through a chamber cooled by circulation of cooled air. The solidified material exiting the cooling chamber is cut into small pieces by a rotating cutter and conveyed by a vacuum conveyor system to a grinder. The material is further broken up (ground) into a powder and transported to a holding bin. Thereafter, the powder is deposited in boxes or other containers for storage.

9 Claims, 2 Drawing Sheets

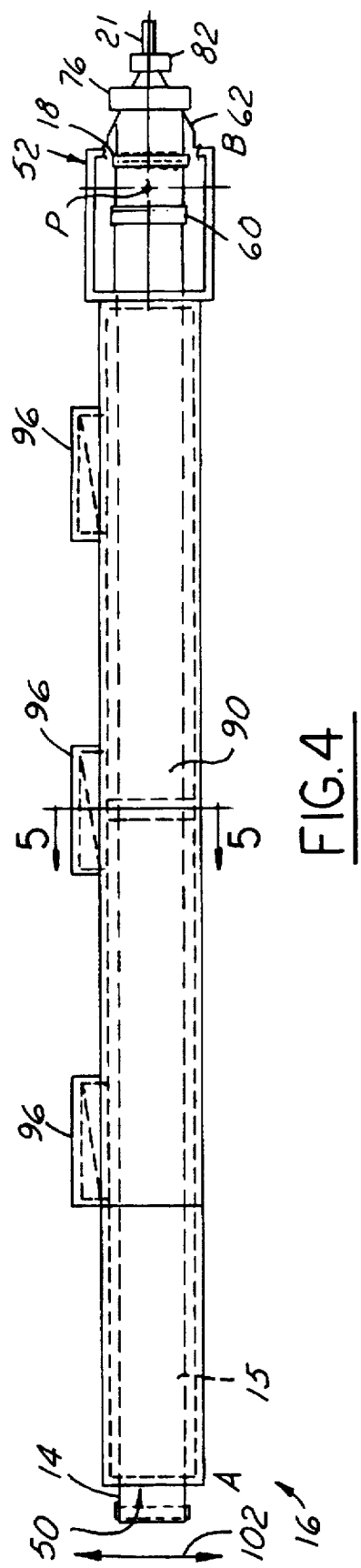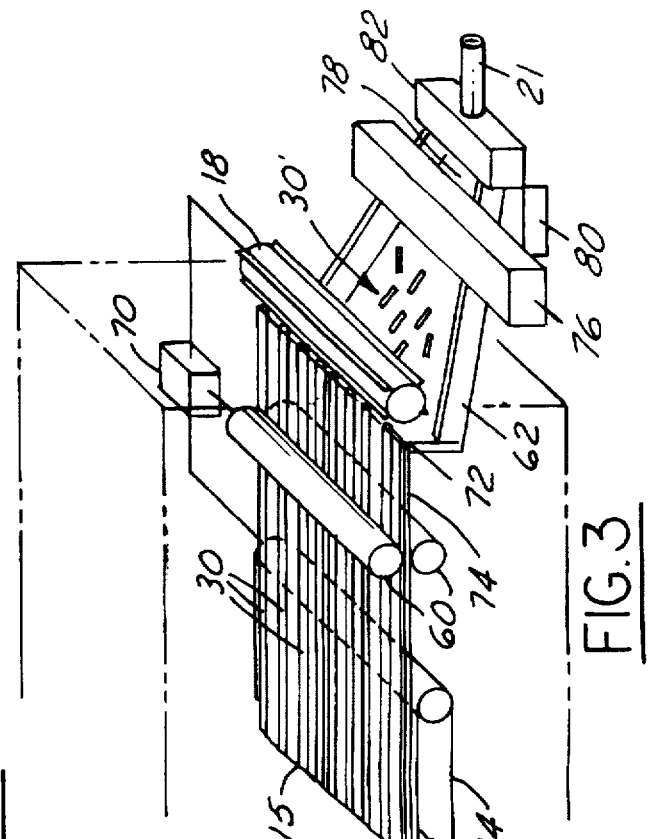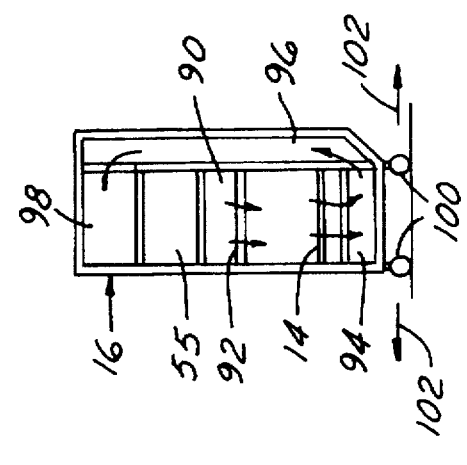

GUM SWEETENER/ACID PROCESSING SYSTEM

TECHNICAL FIELD

The invention is directed to an apparatus and method for the processing of certain ingredients, such as encapsulated sweeteners and acids, for use in chewing gum.

BACKGROUND OF THE INVENTION

A chewing gum generally comprises a water-soluble bulk portion, a water-insoluble chewing gum base portion, and typically water-insoluble flavoring agents. The insoluble gum base generally comprises elastomers, elastomer solvents, resins, polyvinyl acetate, plasticizers, waxes, and inorganic fillers. Once the gum base is formed, emulsifiers, such as lecithin, softeners, such as glycerin and Wesson oil, corn syrup, and bulking agents, such as sugars or sugar alcohols, are added to the molten mass. Later, flavorings, such as flavor oils and/or spray-dried flavors, and sweeteners or acids, are added while mixing is continued until a homogenous mass is achieved. The chewing gum mass is then cooled and later rolled, scored, and wrapped into the final product.

During chewing, the water-soluble portion of the gum product dissipates with a portion of the flavoring agent over a period of time. The gum base portion is retained in the mouth throughout the time that the product is chewed.

Various efforts have been undertaken to try to simplify and reduce the time required for gum base and chewing gum manufacture, as well as to prepare gum base and gum products which have improved commercially acceptable properties. Also, various efforts have been utilized to improve the uniformity and consistency of the ingredients being added to the gum base and chewing gum products, as well as to improve the rate and methods of feeding the ingredients to the gum base and gum products so that more consistent and uniform products are secured batch after batch or production run after production run.

Gum base products and chewing gum products are typically made by the batch method, although continuous extrusion machines are also available for use. Batch methods are labor-intensive and produce chewing gums of varying consistency. Sigma blade batch mixers are typically used for this conventional process. Continuous extruders used to make a final chewing gum product are shown, for example, in U.S. Pat. No. 5,135,762 to Degady et al., U.S. Pat. No. 5,045,325 to Lesko et al., and U.S. Pat. No. 4,555,407 to Kramer et al. Processes using continuous extrusion machines for producing a chewing gum base are disclosed, for example, in U.S. Pat. No. 5,419,919 to Song et al., and U.S. Pat. No. 5,486,366 to Song et al. Continuous extrusion machines which can be used for producing a chewing gum base or final chewing gum product, or both, include extruders from Japan Steel Works, Leistriztz, Werner and Pfleiderer Corp., Buss Mfg. Co., WLS, Togum and Baker Perkins.

Whether a batch-type processor or a continuous extruder-type processor is used to produce the chewing gum, it is important to provide the various ingredients for the product in the optimum form and with optimum physical properties. This improves the speed and efficiency of the final processing. Often, some of the ingredients require special handling or preparation prior to being included in the batch or extrusion process.

Preparation of the ingredients is especially important where continuous extrusion processing is utilized. The ingredients supplied to the continuous extrusion apparatus are preferably provided in the optimum size, shape, condition (liquid, solid, etc.), form and temperature for ease of insertion, metering and intermixing with the other ingredients in the extruder. Also, due to the properties of some of the various ingredients, it is necessary to pre-prepare or pre-blend them in some manner in order to allow them to be inserted or metered in the extruder in the best possible manner.

Several methods and processes exist for preparation of sweeteners and acid delivery systems for chewing gum products. These are shown, for example, in U.S. Pat. Nos. 4,816,265, 5,000,965 and 5,057,328.

It is the general object of the present invention to provide an improved method and apparatus for the production of chewing gum products. It is also an object of the present invention to provide improved apparatus and methods for preparation of the sweetener and acid ingredients for chewing gum products.

It is still another object of the present invention to provide a method and apparatus for manufacturing, cooling and packaging sweetener and acid materials used for chewing gum products.

These and other objects, benefits, and advantages of the present invention are met by the following description of the invention.

SUMMARY OF THE INVENTION

The present invention provides an improved system for processing sweeteners and acids used as ingredients for chewing gum products. A novel process and apparatus are used to manufacture, cool, grind and package such ingredients. Where a continuous extrusion machine is utilized to produce the sweetener or acid ingredients, the ingredients can be extruded directly into the cooling apparatus of the present invention to produce a continuous, steady-state cooling and packaging system.

In accordance with the present invention, the encapsulated sweetener and acid materials are extruded in elongated strands directly onto a conveyor mechanism. The conveyor mechanism transports the materials through an elongated cooling chamber where it is reduced to a desired temperature and solidified. After cooling, the solidified material is broken up by a rotating cutting mechanism and conveyed by a vacuum system to a grinder. The grinder reduces the material to a powder form and the powder is then deposited in a holding tank or hopper. The hopper in turn is used to fill containers or boxes for storage. The sweetener and acid materials are then used for various chewing gum products as needed.

Other features, benefits and advantages of the present invention will become apparent from the following description of the invention, when viewed in accordance with the attached drawings and appended claims.

BRIEF DESCRIPTION OF THE DRAWINGS

FIG. 3 is an enlarged, schematic, perspective view of a portion of a cutting apparatus and process in accordance with the present invention;

FIG. 4 is a top elevational view of the cooling mechanism shown in FIG. 2; and

FIG. 5 is a cross-sectional view of the cooling mechanism of FIG. 4, the cross-section being taken along lines 5—5 in FIG. 4 and in the direction of the arrows.

BEST MODE(S) OF PRACTICING THE INVENTION

The present invention is particularly suitable for processing intense sweetener or acid elastomer core materials, particularly for use in chewing gum products. The sweetener and acid materials are encapsulated in a delivery system, such as polyvinyl acetate. In general, the present invention provides an apparatus and method for cooling, cutting or breaking up the materials, and then grinding and packaging them. In this regard, it is to be understood that the present invention can be used for preparing ingredients and materials other than sweeteners and acids and for use in products other than chewing gum products.

It is also to be understood that the preferred form of the present invention is used with a continuous extruding mechanism for producing the sweetener/acid intermediates. However, the present invention also can be used with batch-type systems for producing the sweetener or acid materials. In this regard, if a batch-type system is utilized, the molten material should be placed in a feeding mechanism of some type in order to properly convey the ingredients to the cooling apparatus as described below.

Figure 1:
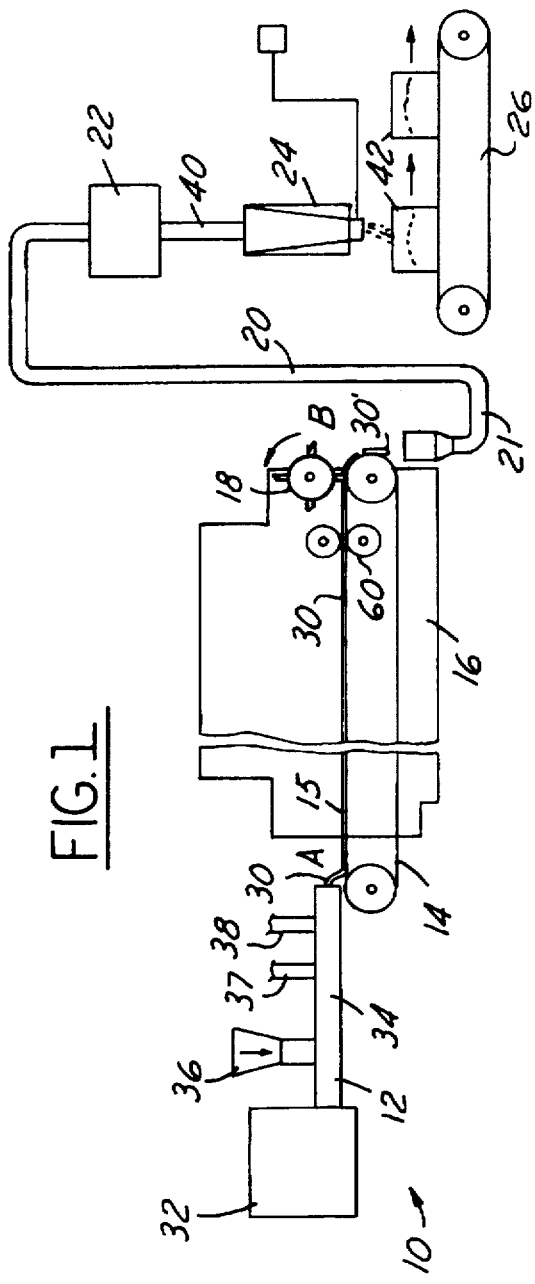
FIG. 1 is a schematic diagram of the sweetener/acid processing system in accordance with the present invention.

A schematic illustration of the system in accordance with the present invention is illustrated in FIG. 1. The preferred cooling and cutting mechanisms in accordance with the present invention are illustrated in FIGS. 2–5.

As shown in FIG. 1, a system 10 includes an extruding machine 12, a conveying mechanism 14, a cooling chamber or apparatus 16, a rotating cutter mechanism 18, a vacuum or pneumatic conveying system 20, a grinder mechanism 22, a hopper or storage container 24, and a second conveying mechanism 26. The encapsulated sweetener or acid material is referred to by the numeral 30 and is extruded from the extruder 12 onto the conveying mechanism 14.

The sweetener or acid ingredients or materials 30 can be of any conventional type for use with a chewing gum product. For example, the sweetener can be a natural or artificial high intensity material, such as amino acid-based sweeteners, dipeptide sweeteners, glycyrrhizin, saccharin and its salts, acesulfame salts, cyclamates, steriosides, talin, dihydrochalcone compounds and mixtures thereof. Similarly, the acid could be any acid ingredient commonly used in food products, such as citric acid, malic acid, ascorbic acid, glucono delta-lactone, tartaric acid, adipic acid, fumaric acid, succinic acid, lactic acid and mixtures thereof.

Preferably, the sweetener or acid also contains an emulsifier and is coated or encapsulated with polyvinyl acetate or the like to delay or prolong the delivery of the sweetener or acid, as well as to stabilize sensitive materials. Sweetener and acid delivery systems are disclosed, for example, in U.S. Pat. Nos. 4,816,265, 5,000,965, and 5,057,328, the disclosures of which are hereby incorporated by reference herein.

The extrusion machine 12 can be of any conventional type having a motor and control mechanism 32, an elongated barrel member 34, and a plurality of feed ports or inlets 36, 37 and 38. An elongated screw mechanism (not shown) of conventional design is positioned in the barrel 34. The solid and liquid ingredients which make up the sweetener or acid are introduced into the extruder through the inlet ports. In this regard, typically solid components or ingredients are fed into inlet 36, while liquid ingredients or components of the material are introduced through inlet ports 37 and 38. (It is understood, of course, that a larger or smaller number of inlet ports could be provided or utilized.)

The coated or encapsulated material 30 is preferably extruded in elongated strings of material directly onto the upper surface or belt 15 of the conveying mechanism 14. The conveyor 14 then transports the material 30 through the elongated cooling chamber 16. The cooling chamber circulates cool air throughout its length and directs it toward the hot material 30 on the conveyor. The cooling chamber 16 reduces the temperature of the material and allows it to solidify quickly. For example, the material 30 at point "A" where it enters the cooling chamber is typically on the order of 190°–200° F. When the material exits the cooling chamber at point "B," the temperature preferably has been lowered to about 70°–80° F.

The rotary cutting mechanism 18 is positioned such that it makes contact with the solidified strings of sweetener or acid material 30 as they exit the cooling chamber 16. The cutter 18 breaks up the material 30 into small pieces 30'. The pieces of material 30' are then conveyed into a vacuum conveyor conduit 21 and pneumatically conveyed through the conveyance system 20 into a grinding apparatus 22.

The grinder 22, which can be of any conventional type, pulverizes the small pieces of sweetener material and reduces the material to a fine powder. The powder is then conveyed by conduit 40 into the hopper or storage container 24.

At that point, the powder can be released and metered into containers or boxes 42 as desired. The boxes are positioned on a conveying mechanism 26 so that the process can be done automatically. After the boxes 42 receive the requisite amount of powder material, they are labeled and sent to storage for later use.

The preferred cooling chamber 16, in accordance with the present invention, is illustrated in FIGS. 2–5. The conveying mechanism 14 begins at a point external to the entrance 50 of the cooling chamber and ends inside the exit end 52 of the cooling chamber. Cooling air is directed into inlet 54 of the cooling chamber and directed by appropriate passageways 56 onto the upper surface 15 of the conveyor 14. In this regard, as stated above, the sweetener or acid material 30 is positioned on the belt 15 in a plurality of elongated strings of material. The air is exhausted through outlet 58 from the cooling chamber.

The conveyor mechanism preferably has an infinitely variable speed control so that the speed of the conveyor can be adjusted to match the speed of extrusion of material from the extruder 12. In this regard, the speed of the conveyor belt 14 regulates the thickness of the strands of material extruded from the extruder. The thickness of the material is adjusted so that the material has sufficiently solidified and hardened by the time the material passes through the cutting mechanism 18.

At the end of the conveyor mechanism 14, the solidified material 30 is transported by a pair of feed rollers 60 into the rotating cutter mechanism 18. The cutter cuts and breaks up the material into small pieces, on the order of one-eighth to one-half inch in length. The small pieces of material 30' are then passed through an exit chute 62 where they are introduced into the conveying system 20.

Figure 2:
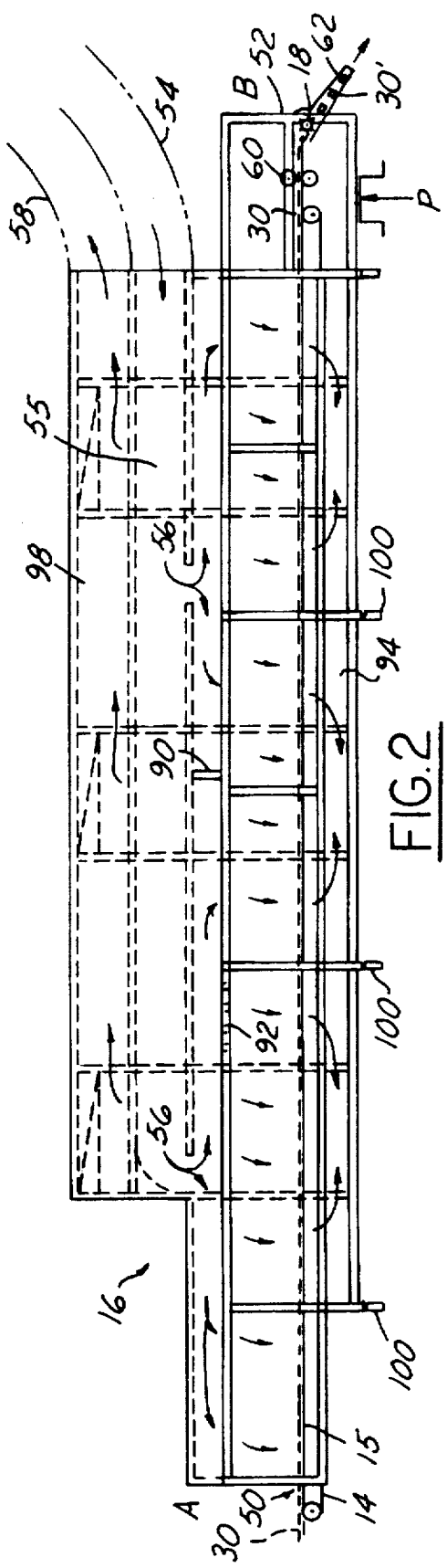
FIG. 2 illustrates a preferred cooling mechanism in accordance with the present invention.

The apparatus 16, as shown in FIG. 2, essentially comprises a cooler/cutter machine having a unitized frame. The frame has an overall length of over 30 feet and is approximately 3–4 feet in width. The frame is covered with metal jacketed insulation panels in order to maintain a cool temperature in the chamber as efficiently as possible. The cooling air is supplied to inlet 54 from a remote unit (not shown) and the chamber 16 has a closed loop flow pattern such that the cooling air is diffused evenly on the material 30 on the conveyor 14.

When the inventive process is in operation, the temperature of the cooling chamber is pre-prepared until the desired process temperature is reached. The speed of the extrusion machine and the conveyor mechanism 14 are then adjusted for the product rate and the material 30 is then fed onto the belt of the conveyor. Preferably, a single motor 70 is utilized to drive the conveyor belt, rollers and cutting apparatus (see FIG. 3). This synchronizes these members and systems and results in more consistent and uniform pieces of material (30').

As the product flows through the cooling chamber 16, cold air is evenly diffused around the product and solidification is accomplished. In this regard, specific finished product parameters are desired. These parameters are a combination of product volume (in pounds per hour), rate of feed through this chamber, cooling temperature, and air velocity.

Cooled air also flows down chute 62 which assists in keeping the material at a reduced temperature throughout the process. The cutting mechanism 18 is also cooled in the same manner.

The product is fed into a pair of feed rollers 60 which consistently and uniformly feed the product into the rotating knife or cutter 18. The cutter is adjusted or provided to cut particular size pieces 30' as desired for the downstream processing requirements.

As shown in FIG. 3, the cutter 18 is a cylinder with a plurality of elongated knife edges (four are shown) positioned axially along its length. The knife edges mate with a fixed edge 72 positioned at the end of platform 74. The platform supports the strands of material 30 after they pass through driving rollers 60.

The cut pieces of material 30' fall by gravity down chute 62 and pass under a metal detector 76 which detects any metallic impurities in the material. If any metal particles are detected, trap door 78 at the end of the chute opens and the impurities fall into trash container 80. If no impurities are detected, the material 30' passes into housing 82 where it is transported through conduit 21 by the conveyor system 20.

The air flow through the housing is controlled in order to secure efficient cooling of the strands of material 30 on the conveyor belt 15. As shown in FIGS. 3–5, cooled air enters the housing 16 at inlet 54, flows along chamber 55, through openings 56, and is directed to cover the full length of the conveyor belt 15 in the housing. In this regard, wall 90 is positioned between the two openings 56 in order to insure adequate cooling at both ends of the housing. Wall 92 in the housing comprises a grate or panel with a plurality of holes or openings and allows flow of the cooled air therethrough. Similarly, the conveyor belt 15 comprises a woven mesh or apertures surface and allows the cooled air to pass over the strands and through the belt into lower chamber 94. As shown in FIGS. 4 and 5, the air which is passed through the belt 15 is directed into one of the side vent shafts 96 and exhausted from the housing through chamber 98 and exit 58.

With the present invention, the sweetener or acid ingredient 30 can proceed through the cooling chamber in less than one minute and be cooled over 100° F. during that period. The temperature of the extruded liquid sweetener is on the order of 190°–200° F., while the temperature of the solidified material as it exits the cooling chamber is on the order of 70°–80° F.

For ease of maintenance of the housing, rotating knife, extruder, etc., the housing 16 is adapted to be moved from its operational position. For this purpose, the housing 16 is pivoted at one end at point "P" to the support surface, and sets of wheels 100 are provided adjacent the other end. As depicted by arrows 102 in FIGS. 4 and 5, the housing can be rotated around point "P" in either direction.

While the above description describes the preferred embodiments of the invention, those skilled in the art will realize that changes and modifications may be made thereto without departing from the spirit and scope of the invention. The invention is intended to claim all such changes and modifications that fall within the true scope of the invention as defined and covered by the following claims.

What is claimed is:

1. A method of processing an ingredient material for a chewing gum product, said method comprising the steps of:

extruding said material into elongated strands of material;

supplying said strands of material to a cooling device;

conveying said strands of material through the cooling device by a conveyor and simultaneously reducing the temperature and solidifying said material in said cooling device by circulation of cooling air through said cooling device;

dividing said material into small pieces within said cooling device by use of a rotating cutting device; and grinding said small pieces into a powder.

2. The method as set forth in claim 1 further comprising the step of transporting said small pieces to a grinder by a vacuum conveying system.

3. The method as set forth in claim 1 further comprising the step of transporting said powder into a hopper.

4. The method as set forth in claim 1 further comprising the step of packaging said powder into containers for subsequent use.

5. The method as set forth in claim 1 wherein said material is selected from the group consisting of a sweetener or an acid material.

6. The method of processing as set forth in claim 1 wherein an infinitely variable motor is utilized for conveying said material through said cooling device on said conveyor, whereby the temperature and size of said strands of material can be adjusted as desired.

7. The method of processing as set forth in claim 1 further comprising the steps of varying the temperature and size of said strands of material by adjusting the speed of conveying said material through said cooling device.

8. The method of processing as set forth in clam 1 further comprising the step of synchronizing the speed of the said conveyor and rotating cutting device to produce more consistent and uniform pieces of material.

9. The method of processing as set forth in claim 1 wherein said conveyor has a plurality of apertures therein to allow circulation of cooling air therethrough.

* * * * *